United States Patent

[11] 3,603,330

| [72] | Inventors | Halldor K. Halldorson<br>35 Somerville Rd.;<br>Irving O. Nelson, 2055 Argyle St., both of<br>Regina, Saskatchewan, Canada |
|---|---|---|
| [21] | Appl. No. | 794,190 |
| [22] | Filed | Jan. 27, 1969 |
| [45] | Patented | Sept. 7, 1971 |
| [32] | Priority | Dec. 3, 1968 |
| [33] | | Canada |
| [31] | | 36,741 |

[54] COLLAPSIBLE TENT
4 Claims, 14 Drawing Figs.

| [52] | U.S. Cl. | 135/1 |
|---|---|---|
| [51] | Int. Cl. | A45f 1/00 |
| [50] | Field of Search | 135/1, 1 A; 296/23 |

[56] References Cited
UNITED STATES PATENTS

| 2,582,635 | 1/1952 | Kipple | 135/1 X |
| 3,190,689 | 6/1965 | Calthorpe | 296/23 X |
| 3,411,819 | 11/1968 | Tyree et al. | 296/23 |

*Primary Examiner*—J. Karl Bell
*Attorney*—Weir, Marshall, MacRae & Lamb

ABSTRACT: A collapsible tent or camper for carriage on a vehicle and having a rigid floor and with a rear wall and sidewalls which are hingedly attached along the sides and rear of the floor so that the walls can be folded down in overlapping relationship; the sidewalls of a somewhat triangular shape and a roof hingedly connected at its forward end to the front of the floor, the roof covering the sides in the collapsed condition and resting on the top edges of the walls in the erected position.

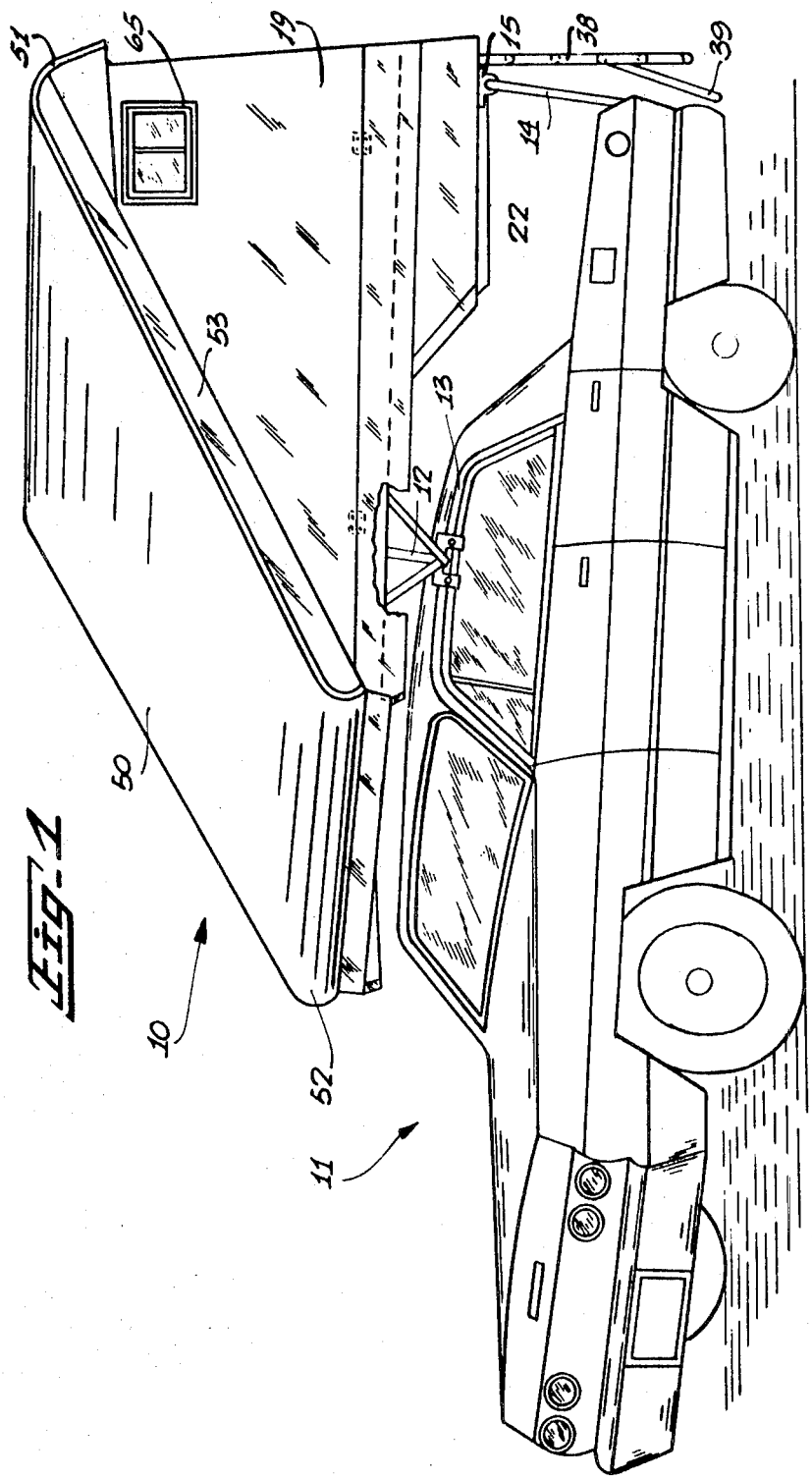

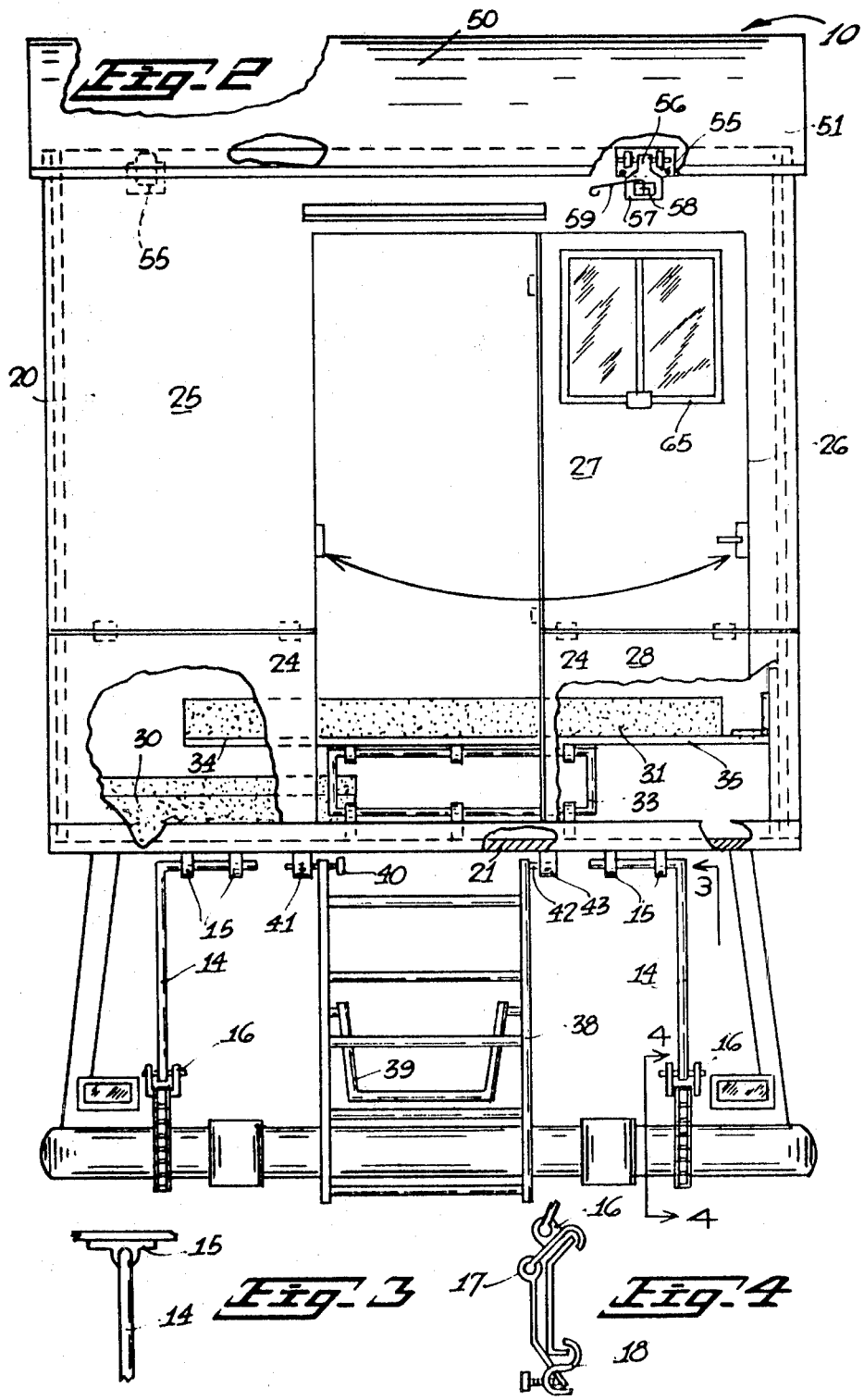

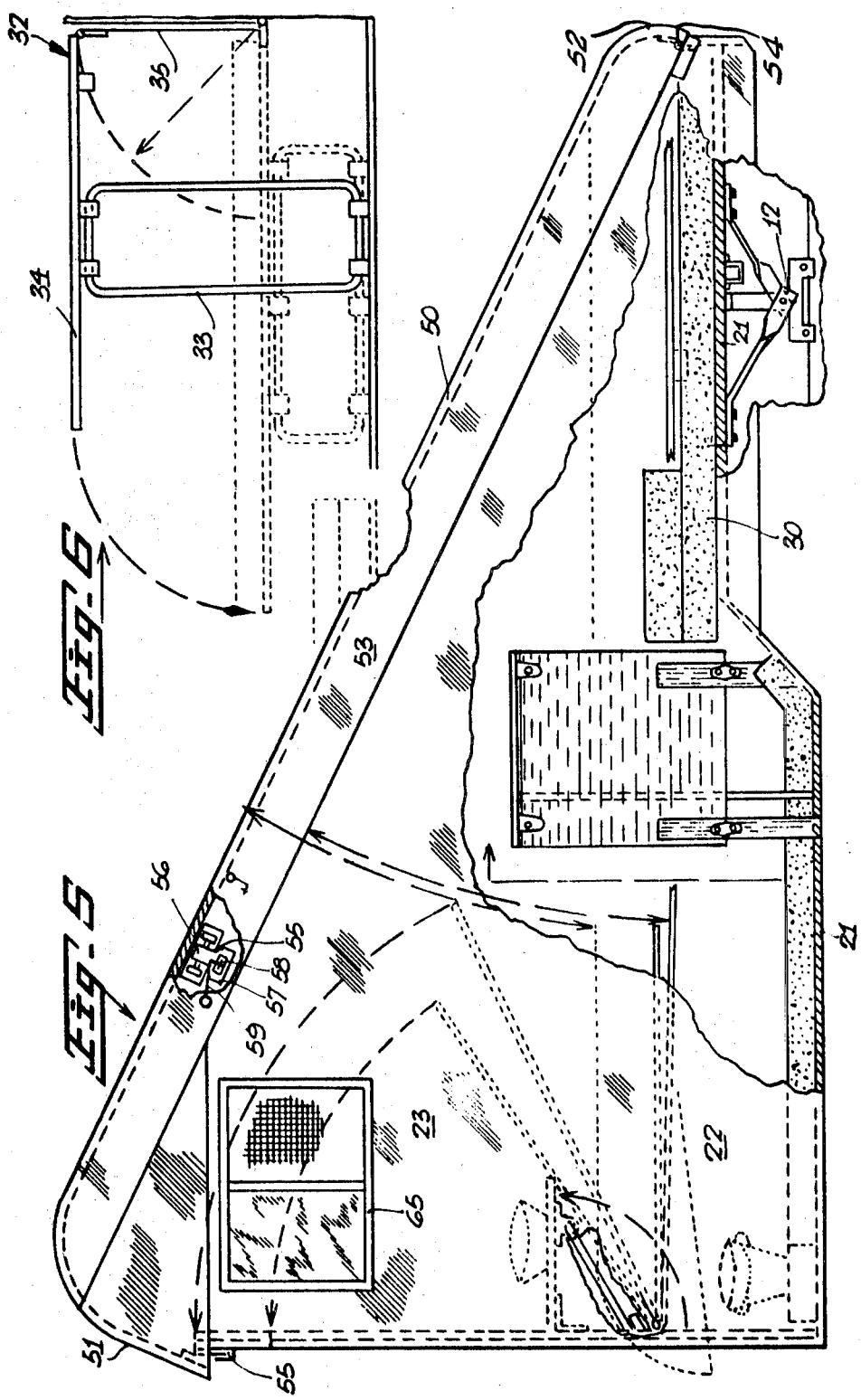

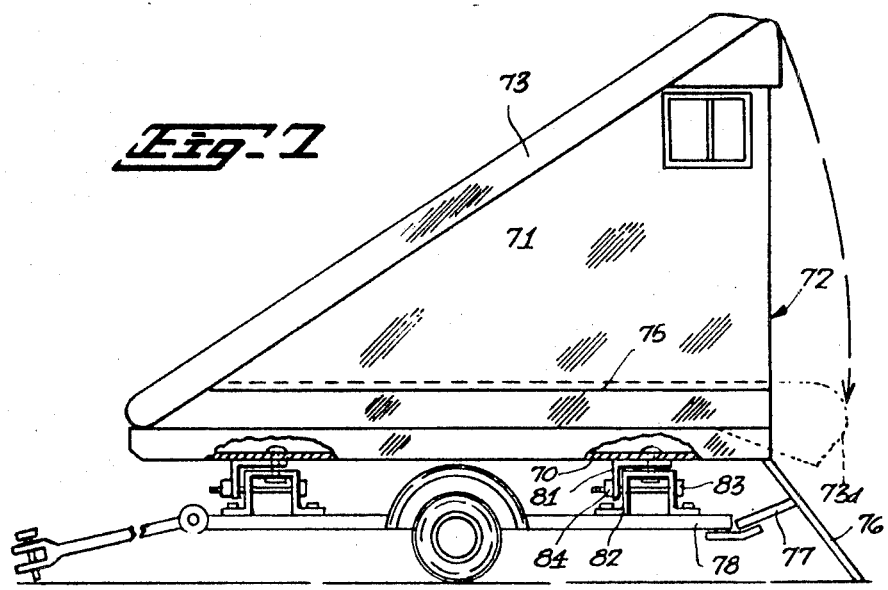
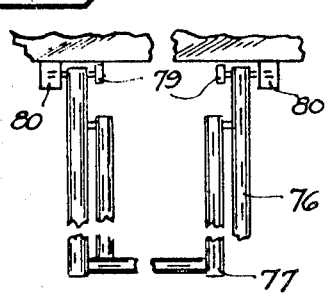
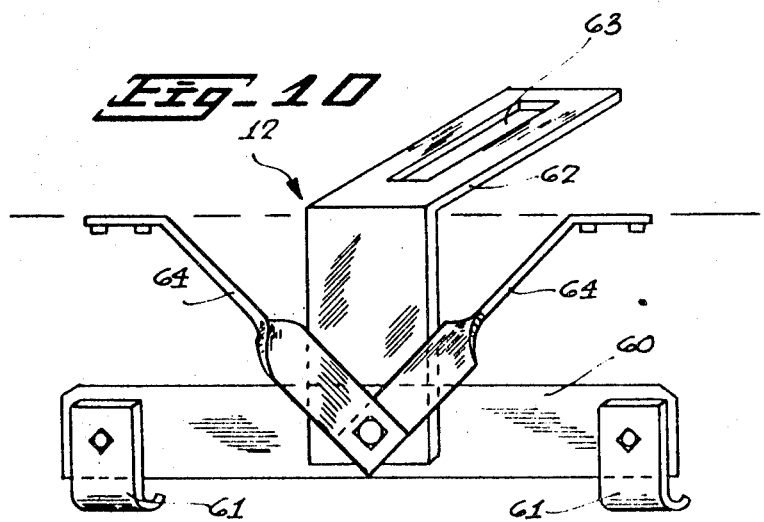

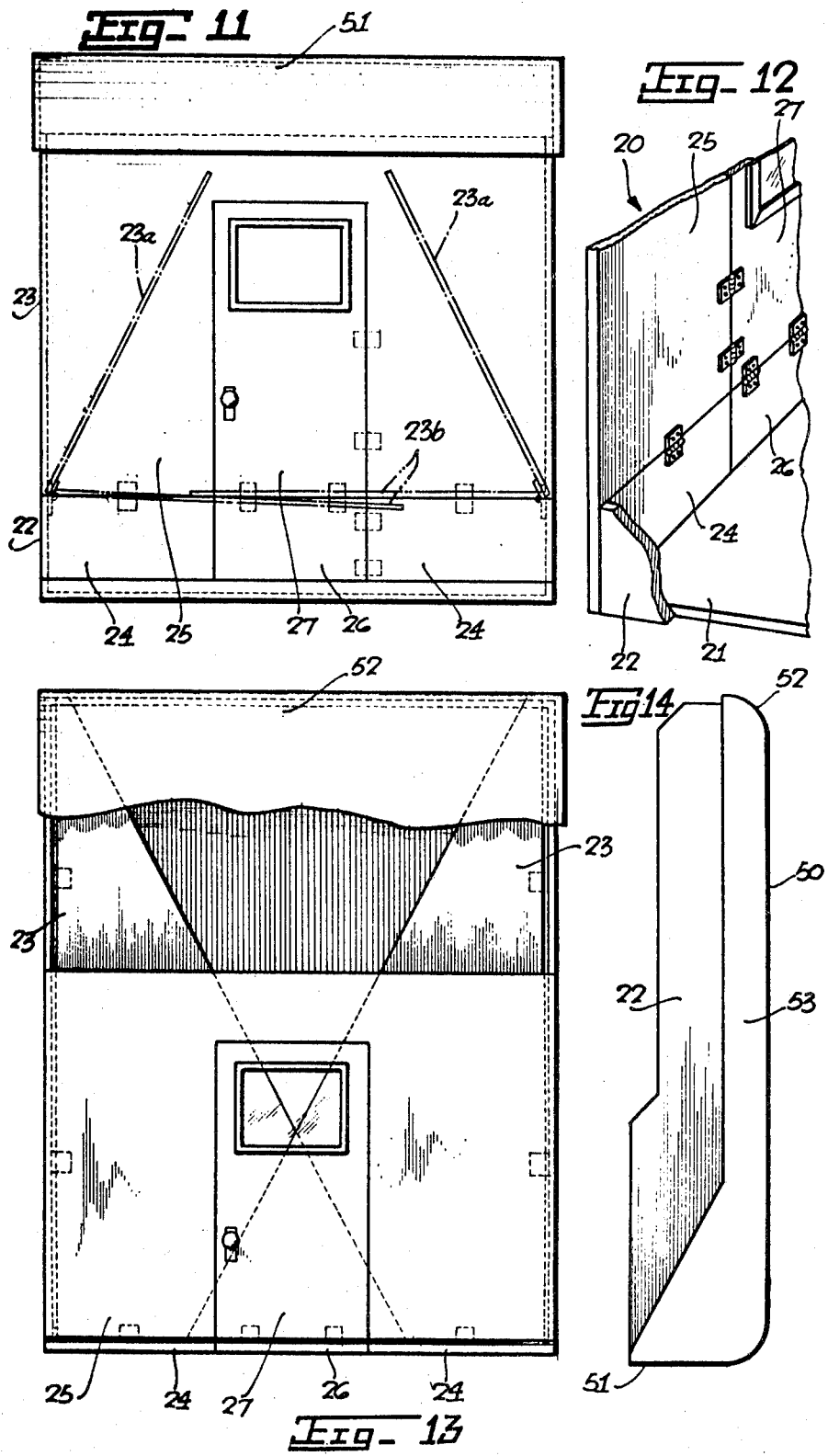

COLLAPSIBLE TENT

This invention relates to collapsible or foldable tents, such as camping tents or shelters, which can be carried on automobiles in a collapsed or folded condition, and erected on the automobile for use. The invention also relates to such tents which can also be carried on other forms of vehicular transport, such as on trailers, and erected thereon for use. Tents in accordance with the present invention can be adapted for carriage alternatively on automobiles and other forms of vehicles.

The use of trailers of various types is very widespread, but a trailer, even a collapsible camping trailer, can be an inconvenience. While it has been proposed to fit collapsible tents on vehicles, these suffer from various disadvantages, particularly with respect to ease of erection and interfering with the performance of the vehicle.

The present invention provides a form of collapsible accommodation which is easily attached to and detached from the roof of a car, or some other conveyance, is readily erected and collapsed or folded, and in the folded condition does not interfere with the performance of the vehicle.

In accordance with the invention, there is provided a collapsible, or foldable, tent for carriage and erection on a vehicle, comprising rigid floor, rear wall and sidewalls, the sidewalls and rear wall hingedly connected to the sides and rear end of the floor, for folding down in overlying relationships, the sidewalls triangular in elevation with the bases of the triangles cooperating with the end wall in the erected condition, and a roof having its forward end hingedly connected to the forward end of the floor to overlie the side and end walls in the collapsed condition and arranged to cooperate with top edges of the side and end walls in the elevated condition.

The invention will be readily understood by the following description of certain embodiments, by way of example, in conjunction with the accompanying drawings, in which:

FIG. 1 is a perspective side view of a tent on an automobile, in the erected condition, FIG. 2 is an end view of the tent of FIG. 1, certain parts of the rear wall broken away to show interior details, FIG. 3 is a view of a detail of the bumper support, as indicated by section line 3—3 on FIG. 1, FIG. 4 is a view of the bumper mounting on the line 4—4 of FIG. 1, FIG. 5 is a side view of the tent, with some parts indicated in phantom, and parts of the sidewall broken away to show interior details, FIG. 6 illustrates the erection of a table in the tent, FIG. 7 is the side view of a tent mounted on a trailer, FIGS. 8 and 9 are end and side views respectively of the ladder for the arrangement of FIG. 7, FIG. 10 is a perspective view of a mounting bracket for attachment of a tent to the gutter of an automobile, as in FIG. 1, FIG. 11 is a diagrammatic end view illustrating part of the folding sequence, FIG. 12 is a perspective view illustrating part of the folding sequence, FIG. 13 is a diagrammatic plan view of a tent in the folded or collapsed condition, and FIG. 14 is a side view of the folded tent of FIG. 13.

As illustrated in FIG. 1, a tent or portable shelter 10 is supported over the roof and boot of an automobile 11. The tent 10 is supported and attached at the front end by brackets 12, one on each side, which fit onto the gutter 13. At the rear the tent is supported by struts 14 which are pivotally attached to the floor of the tent by brackets 15. The attachment of the lower ends of struts 14 to the bumper of the car is seen more readily in FIG. 2. The struts 14 are pivotally connected to hinge 16 on a two-part linkage 17. A clamp 18 at the bottom of the linkage tightens the linkage 17 on to the bumper.

The tent has triangular sidewalls 19, the apex of the triangle towards the front. An end wall 20, FIG. 2, extends across the rear, and the side and end walls are attached to a floor 21, seen in FIGS. 2 and 5. In the example illustrated the floor 21 is lower at the rear than at the front, to provide increased headroom, but the floor can be at one level, if desired. The sidewalls and end wall are in two parts. To permit folding of the walls, particularly in view of the two-level floor 21, the sidewalls each have a lower portion 22 rigidly attached to the floor and an upper portion 23 hingedly connected to the floor, through the rigidly attached portions 22. Similarly the rear wall 20 has a lower portion 24 rigidly attached to the end of the floor 21 and an upper portion 25 hingedly connected to the floor through lower portion 24. The rear wall has a door 26, shown in the open position in FIG. 2, which is also in two parts, upper and lower 27, and 28 respectively, hingedly connected.

The level of the hinge line between top portions and lower portions of the walls, and the door, may be such that it is also above the level of certain fittings, such as beds. This is the arrangement as illustrated in FIGS. 1, 2 and 5. As will be seen particularly in FIGS. 2 and 5, one bed 30 extends longitudinally at the forward end and to one side, and another bed 31 extends laterally at a position intermediate the ends. Beds can be positioned elsewhere also. The bed 31 uses a table 32, in a lowered position, as in FIG. 1, as a base. For use as a table, the bed is removed and the table raised by using a support 33 in an upright position, as in FIG. 6. The support 33 is used in an alternative, lowered, position when the table is in use to support the bed 31, as in FIG. 2. The table has two parts 34 and 35, pivotally connected, part 34 becoming the tabletop when in the table configuration. The end of part 35 remote from part 34 is hinged to the sidewall 19. Part 35 is in close proximity to the wall when in the table configuration, but swings down to provide the additional length when the bed 31 is in position. The hinge line across the rear wall will normally be slightly higher than that across the sidewalls to permit the rear wall to fold down on the sidewalls.

Access to the interior of the tent is by a ladder 38 pivotally attached to the underside of the floor 21 at the rear end. The ladder 38 is supported in position by a bracket 39 which rests on the bumper of the automobile. When the tent is collapsed or folded, the ladder can be removed by taking out pivot pin 40 from bracket 41, after which the ladder can be twisted slightly and the other pin 42 will slide out of bracket 43.

The roof 50 comprises a substantially flat panel having downwardly curved ends 51 and 52, and downwardly extending side members 53. The roof is pivotally connected to the forward end of the floor 21, at 54. The side members overlap the top edges of sidewalls 19 and rear end 51 overlaps the top edge of the rear wall 20. The roof 50 is connected to the tops of side and end walls by connectors 55. The form of connectors used can be varied, but in the embodiment illustrated a loop member 56 is pivotally attached to the roof, the loop 57 fitting over a staple 58 projecting from the wall 19 or 20 as the case may be. A hook 59 is passed through the staple 58 after the loop 57 is fitted over the staple. The connectors 55 can be on the inside or outside, as may be convenient.

FIG. 10 illustrates in more detail a bracket 12 as used to attach the tent to the automobile roof. It comprises a longitudinally extending beam 60 having clips 61 at each end for gripping the gutter. A main bracket member 62 extends upwardly and then inwardly for the main support of the tent, having a slot 63 for a bolt to connect to the tent floor. Two strengthening struts 64 are provided.

Windows 65 can be provided in the sidewalls 19, and end wall 20, and in the door 26. Some form of roof light, and a ventilator, can be provided in the roof, if desired.

The folding, or collapsing, of the tent can be understood by the following, in conjunction with FIGS. 11 to 14. First, the connectors 55 at the tops of the sidewalls 19 are undone, and then the upper portions 23 of the sidewalls are folded inwards and downwards to lie more or less horizontally, one on top of the other, as indicated by dotted line 23a and 23b in FIG. 11. After the sidewalls are folded down, the connectors 55 at the top of the rear wall 20 are undone and then the top portion 25 of the rear wall folded down on top of the sidewall portions 23.

While the rear wall is being folded, the roof 50 is supported in the up position, and is then lowered onto the folded-down walls. The tent finally appears as in FIG. 13.

It will be appreciated that the division of the rear wall 20 into upper and lower parts results is some difficulty with the door 26. For the door to open and close as a unit, when the tent is in the erected condition, some connecting means is necessary between the top and bottom parts 27 and 28. At the same time it is necessary that the connection permit folding down of the top part of the door with the upper portion of the rear wall. A suitable connection can be made by forming interengaging shapes on the opposed edges of the top and bottom parts, such as cooperating protrusions and grooves. Alternatively, some mechanical connector such as a latch can be used, the latch being undone prior to folding, if necessary. Another alternative is to use normal hinges, as seen in FIG. 14. It is also possible to arrange for the door to be folded down separately from the rear wall by making the hinges, connecting the door to the wall, of a readily disconnectable type.

As previously stated, a tent in accordance with the present invention can also be used on a trailer. FIG. 7 illustrates such an arrangement. FIG. 7 also illustrates a modification to the tent in that it has a flat floor. It will be appreciated that a tent with a stepped floor, as in FIGS. 1 to 6, can readily be used on a trailer as in FIG. 7 by providing a suitable support for the front end and, similarly, the tent as illustrated in FIG. 7 could be used on an automobile.

The tent of FIG. 7 has a floor 70, sidewalls 71, rear wall 72 and roof 73. The sidewalls hinge at a hinge line 75 and the rear wall also folds down at approximately the same level, to overlie the sidewalls when folded or collapsed. The roof extends over the side and end walls and assumes the position shown by dotted line 73a, when folded. A ladder 76 provides access, the ladder steadied by a strut 77 which rests against the trailer 78. The ladder can be removed by withdrawing pins 79 from brackets 80, in FIG. 8.

The means for supporting the tent on the trailer can vary and in the arrangement shown, brackets 81 are attached to the floor 70, further brackets 82 being attached to the trailer 78. Bolts 83 are passed through the brackets, being fastened by nuts 84.

Nuts can be provided both with some form of brackets, as 81, and also brackets and struts 12 and 14 as in FIG. 1.

The construction of the tent can vary. Conveniently the floor, walls and roof may be panels of wood, or aluminum, or different materials can be used for the various parts. The panels can be built up on wood or metal framing. Suitably reinforced or other form of substantially rigid plastic sheeting can also be used, particularly for the roof. The panels can be of single- or double-skin construction. The floor may comprise a panel of heavy plywood carrying angle or channel members, or other forms of stress-carrying members. There is little loading of the walls and roof and these can be of very light construction. In the erected condition, a roomy comfortable form of mobile accommodation is provided, and when folded or collapsed, little or no effect occurs on the performance of the vehicle.

We claim:

1. A collapsible tent for carriage and erection on a supporting vehicle, comprising; a floor, rear wall and opposed sidewalls, each of substantially rigid construction, the rear wall hingedly connected to a rear end of the floor and the sidewalls hingedly connected to opposite sides of the floor whereby the rear wall and sidewalls can be folded down over said floor in overlying relationship, the sidewalls of triangular form in elevation and with the base of the triangle cooperating with said rear wall in the erected condition; a roof having a forward end hingedly connected to the forward end of the floor to overlie the side and end walls in the collapsed condition and adapted to cooperate with top edges of said side and end walls in the erected condition; a door in said end wall, means for releasably connecting the roof and said side and end walls in the erected condition; said floor comprising two levels, a first level forward for clearance over the roof of an automobile and a lower second level rearward for clearance over the rear of said automobile, means for releasably supporting said first level above the roof of said automobile and means for releasably supporting said second level from the rear bumper of said automobile.

2. A collapsible tent as claimed in claim 1 including a ladder pivotally attached at its upper end to the rear end of the floor and including support means for engagement with the rear bumper of the automobile.

3. A collapsible tent as claimed in claim 1, said end and sidewalls hingedly connected to said floor by a lower portion of each wall rigidly attached to and extending upward from said floor.

4. A collapsible tent for carriage and erection on a supporting vehicle, comprising; a floor, rear wall and opposed sidewalls, each of substantially rigid construction, the rear wall hingedly connected to a rear end of the floor and the sidewalls hingedly connected to opposite sides of the floor, whereby the rear wall and sidewalls can be folded down over said floor in overlying relationship, the sidewalls of triangular form in elevation and with the the base of the triangle cooperating with said rear wall in the erected condition; a roof having a forward end hingedly connected to the forward end of the floor to overlie the side and end walls in the collapsed condition and adapted to cooperate with top edges of said side and end walls in the erected condition; a door in said end wall; means for releasably connecting the roof and said side and end walls in the erected condition; said end and side walls hingedly connected to said floor by a lower portion of each wall rigidly attached to and extending upward from said floor, and means for supporting at least one bed on said floor comprising a table adapted to extend in an elevated position and in a lowered position, the bed at least partly supported by the table when the table is in lowered position, the lower portions of said walls extending to a height above the level of said bed.